United States Patent [19]

Werner et al.

[11] Patent Number: 4,632,882

[45] Date of Patent: * Dec. 30, 1986

[54] FILLER WIRE

[75] Inventors: Alexander Werner, Glattbrugg; Heinz Pfenninger, Volketswil, both of Switzerland

[73] Assignee: Schweissindustrie Oerlikon Buhrle AG, Zurich, Switzerland

[*] Notice: The portion of the term of this patent subsequent to Apr. 22, 2003 has been disclaimed.

[21] Appl. No.: 724,021

[22] Filed: Apr. 17, 1985

[30] Foreign Application Priority Data

Apr. 18, 1984 [EP] European Pat. Off. ............ 84104383

[51] Int. Cl.4 ...................... B23K 35/40; B23K 35/24; B23B 15/16; B23B 15/18
[52] U.S. Cl. .................................... 428/558; 428/550; 219/145.1; 219/146.31
[58] Field of Search ............... 428/550, 552, 557, 558, 428/559; 419/3, 6, 7; 219/145.1, 145.22, 146.31

[56] References Cited

U.S. PATENT DOCUMENTS 4,396,820  8/1983  Puschner .................... 219/121 ED

FOREIGN PATENT DOCUMENTS 0003370  8/1979  European Pat. Off. .

Primary Examiner—John F. Terapane
Assistant Examiner—Eric Jorgensen
Attorney, Agent, or Firm—Bachman & LaPointe

[57] ABSTRACT

The filler wire is a closed tube, in whose interior is located a filling of two or more pulverulent material components. With the split tube still open, the filling is introduced in the form of layers and then the split tube is closed. As a result of the filling introduced in layer form, a favorable set of conditions for closing or sealing the tube, for example by welding, is provided.

4 Claims, 3 Drawing Figures

FILLER WIRE

BACKGROUND OF THE INVENTION

The invention relates to a filler wire, which is formed in random length from a tubular, metal jacket or covering and a pulverulent material filling surrounded by said jacket or covering, as well as to a process for the production thereof.

Filler wires, which are produced with random length, particularly for use in mechanized welding installations, have a tubular, metal covering, in whose interior is introduced a pulverulent material filling. Various processes and installations are known for the production of such filler wires.

In a known process (EP-A-3,370), a metal strip is shaped to form a channel, in which is introduced pulverulent filling material, after which the channel is shaped and welded in a welding station. For example, the introduced pulverulent filling material can be a mixture formed from different components, which e.g. have a flux-forming material, a slag-forming material and/or a material containing metals or metal oxides. Such mixtures suffer from the disadvantage that they separate during storage and then are introduced into the channel with a composition differing from the original composition of the mixture. The aforementioned risk of separation can admittedly be counteracted through the use of a pulverulent filling of agglomerated material particles, but this leads to increased production expenditure.

In order to ensure the flowability of the filling material, the particle size thereof must be kept correspondingly small. Thus, there is a risk of such particles being deposited on the longitudinal edges of the channel, which is open at the top, so that the welding process can be impaired and a clean weld is not formed. This disadvantage can in particular occur in the case of powder fillings having ferritic or ferromagnetic components, whose particles can be moved by the magnetic fields which appear during welding. It is admittedly known that this problem can be counteracted in that the introduced filling material is initially covered by a cover strip and only then is the channel compressed to form a tube and the longitudinal edges welded together, (DE-A1-25 15 342). Another solution of this problem consists of shaping a step-like reinforcing seam or fin on a longitudinal edge of the continuous strip used for producing the filling wire and by employing a profiling mechanism. During the compression of the channel, said reinforcing seam assumes a position with respect to the tube in which it covers the slit between the two longitudinal edges on the inside and consequently prevents the deposition of particles on said lateral edges (DE-Al-30 27 547). Although the extra production costs are limited, the additional material required for forming the reinforcing seam has a disadvantageous influence.

SUMMARY OF THE INVENTION

The problem of the invention is to so develop a filler wire of the aforementioned type that, while avoiding the disadvantages of the known solution, the longitudinal edges of the filler wire can be welded without additional expenditure and in a completely reliable manner.

According to the invention, this problem is solved in that the pulverulent filling consists of several material components, which are arranged in two or more superimposed layers.

The invention also relates to a process for the advantageous production of the filler wire according to the invention, wherein, prior to welding or sealing, by means of at least two juxtaposed powder dosing stations, different pulverulent material components are introduced in the form of layers into the continuous split tube, in such a way that the lowermost layer is introduced by the first powder dosing station and the further layers by the following powder dosing station, considered in the direction of movement of said slit tube.

BRIEF DESCRIPTION OF THE DRAWINGS

The invention is described in greater detail hereinafter relative to two non-limitative embodiments and with reference to the attached drawings, which show.

DETAILED DESCRIPTION OF THE PREFERRED EMBODIMENTS

The invention is based on the idea that the separation of a mixture intended for the filling of a filler wire can be avoided if the individual material components of the mixture are introduced separately into a split tube, shaped from a continuous strip and prepared for the production of the filler wire. As a result of the dosing of the individual components, it is reliably ensured that the desired composition of the mixture is present at any point of the split tube.

Figure 1:
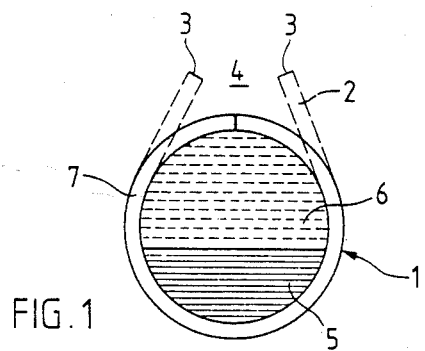
FIG. 1 is a first embodiment of the filler wire according to the invention.

FIG. 1 shows a continuous strip 1 intended for the production of the filler wire and which is preshaped to form a split tube 2, as is shown by the dotted line representation in FIG. 1. An opening in the form of a slit 4 is formed between the longitudinal edges 3 and strip 1 and through it the pulverulent filling can be introduced into the moving split tube 2. The individual material components are introduced successively and in the form of layers.

In the filler wire shown in FIG. 1, two material components are introduced in two layers 5, 6. The lowermost layer 5 in the bottom of the tube can, for example, consist of an iron or iron alloy powder, but this layer could also be formed by ferritic and other magnetic powders.

Layer 6 appropriately consists of a non-magnetic material component, e.g. a mineral material. When the two layers 5, 6 have been introduced, the split tube 2 is compressed to form a closed tube 7, see the continuous line representation in FIG. 1, after which the longitudinal edges 3 are welded together. Through the arrangement of iron or iron alloy powders as the lowermost layer 5, the layer 6 above it protects layer 5, so that it is not influenced or only slightly influenced by the eddy currents during welding. Thus, a favorable welding prerequisite is provided through the layerwise arrangement of layers 5 and 6.

Figure 2:
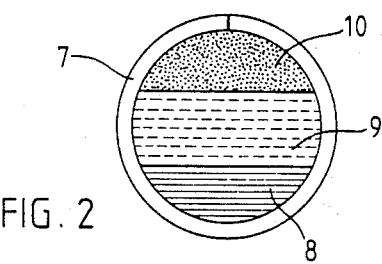
FIG. 2 is a second embodiment of the filler wire according to the invention.

FIG. 2 shows a closed tube 7, whose pulverulent material filling consists of three layers 8, 9, 10, i.e. three different material components are fed in through three different dosing means. Once again, the lowermost layer 8 can be a component of an iron or iron alloy powder, while the next layer 9 is, for example, a fine-grained component and the final layer 10 a coarse-grained component. As a result of such an arrangement, the requirements for reliable welding are further improved, because the top, coarse-grained layer 10 forms a relatively stable covering.

Figure 3:
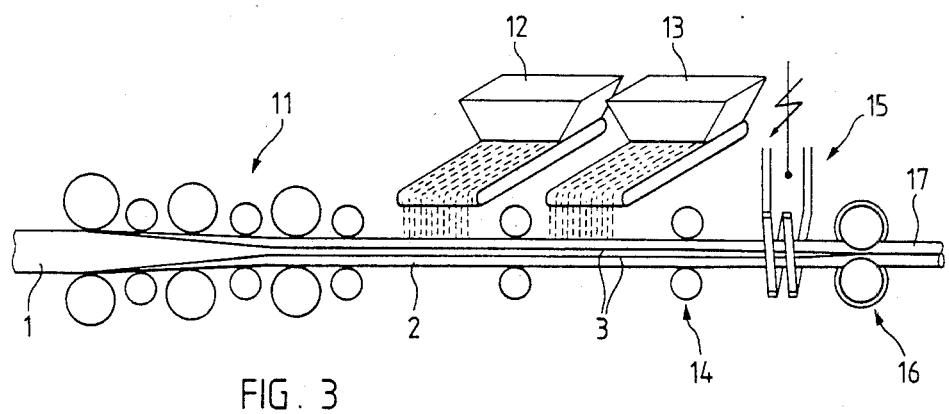
FIG. 3 is a diagrammatically shown installation for producing filler wires.

FIG. 3 shows how the layerwise introduction of the material components takes place. The continuous strip 1 (shown in a position turned by 90°) is preshaped in a shaping mechanism 11 to give a split tube 2 (FIG. 1) and in this form passes by the powder dosing balances, a number of balances corresponding to the number of material components to be introduced being necessary. The balances are juxtaposed, in such a way that the first dosing balance 12 contains the component for forming the bottom layer 5. Split tube 2 moves with layer 5 to dosing balance 13, where the second layer 6 is placed on the first layer 5. The split tube 2 then passes through a calibrating or sizing station 14, in which the longitudinal edges 3 are further compressed against one another. In a following welding station 15, e.g. having a high frequency welding installation, the longitudinal edges 3 of split tube 2 are brought to the welding temperature and are subsequently brought together and welded in a compression-rolling station. The welded tube 17 is then brought to the desired filler wire diameter in a rolling operation and optionally in a drawing operation. Three powder dosing balances are necessary for producing the filler wire according to FIG. 2.

No disadvantages result from the layerwise introduction of the material components of the pulverulent filling when using the filler wire in welding installations, because on melting the filler wire, the components immediately uniformly mix with one another in the resulting liquid phase.

The layerwise introduction of the pulverulent filling also provides a further advantage. In U.S. patent application Ser. No. 724,066, now U.S. Pat. No. 4,584,169 for PROCESS, APPARATUS AND INSTALLATION FOR THE CONTINUOUS PRODUCTION OF A FILLER WIRE, by Alexander Werner and Heinz Pfenninger, the applicants herein, filed of even date herewith, the disclosure of which is incorporated herein by reference, it is stated that the bottom layer 5 or 8 can contribute to an improvement of the welding performance in the high frequency welding of split tube 2, if the material of said layer consists of iron powder. This layer then has a similar property to an impeder arranged in the interior of the tube on concentrating the current. The impeder is made from a ferritic material and has a relative permeability, corresponding to that of iron powder, whose iron particles are oxidized as in the case of a ferrite. The same action is achieved through introducing a rod or wire into the interior of the tube.

The layerwise arrangement of the pulverulent material components can be used in the same way with seamed filler wires.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A filler wire formed with a random length which comprises a tubular metal covering and a pulverulent material filling therein surrounded by said tubular metal covering, wherein the pulverulent filling comprises at least two material components which are arranged in at least two superimposed layers.

2. A filler wire according to claim 1 wherein the pulverulent filling consists of two layers, wherein one layer has ferromagnetic or ferritic material particles.

3. A filler wire according to claim 1 wherein the pulverulent filling comprises three layers including a lowermost layer of ferromagnetic or ferritic material particles and at least one of the other layers have a different particle size distribution than said lowermost layer.

4. A filler wire according to claim 3 wherein the layer furthest from the lowermost layer has coarser particles than said lowermost layer.

* * * * *